Feb. 25, 1958
A. S. STERN
2,824,434
FLEXIBLE SHAFT COUPLING
Filed May 11, 1955
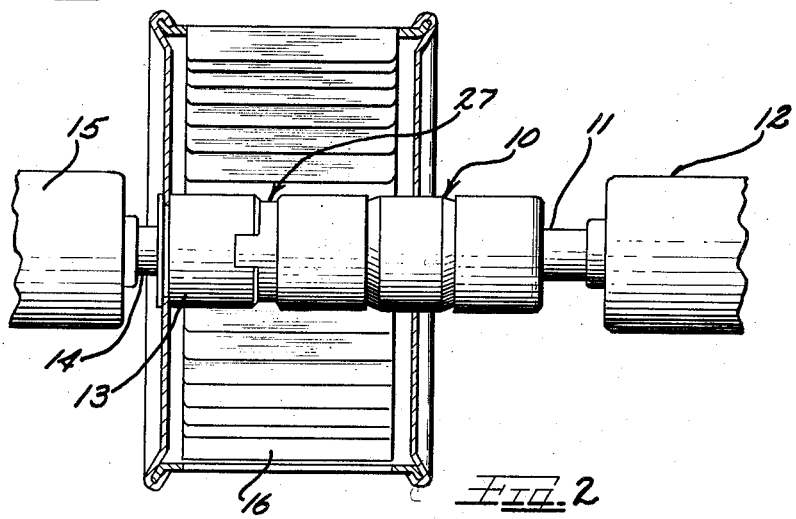
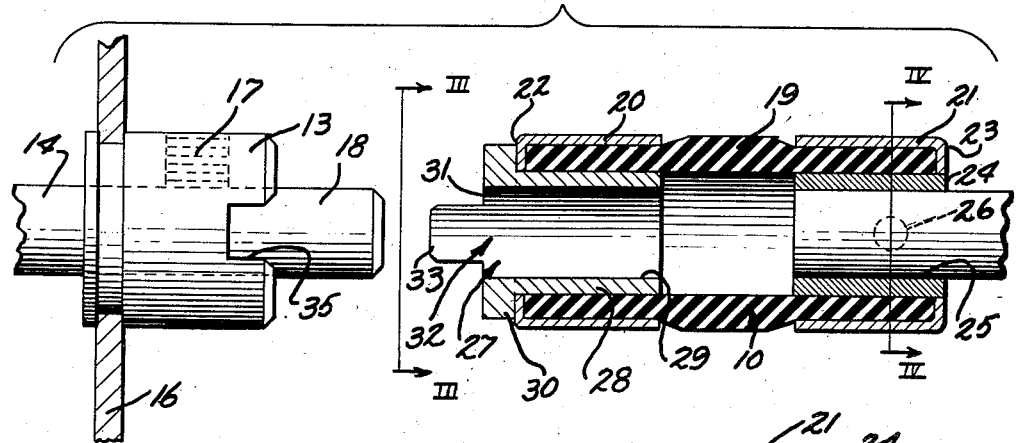
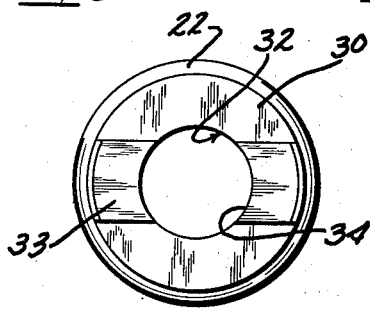
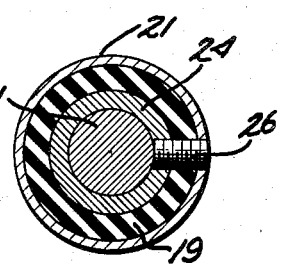
Inventor
ARNOLD STERN United States Patent Office 2,824,434
Patented Feb. 25, 1958

2,824,434
FLEXIBLE SHAFT COUPLING
Arnold S. Stern, Chicago, Ill.
Application May 11, 1955, Serial No. 507,551
2 Claims. (Cl. 64—11)

This invention relates to couplings, and more particularly to a flexible coupling having improved means for connecting driving and driven members together.

Heretofore, one of the principal problems sought to be alleviated by flexible coupling manufacturers was to provide a coupling which would be of such construction as to minimize the cantilever or wobble effect between the flexible coupling and shaft in normal driving operation. This cantilever effect is not only undesirable because it has a propensity to create noises in operation but additionally shortens the effective life span of the flexible coupling.

It is accordingly an important object of this invention to provide a flexible coupling of such construction as will eliminate or at least greatly minimize the undesired cantilever action between the flexible coupling and shaft.

Another object of this invention is to provide in a flexible coupling including a tube-like hose, an end fitting or bushing which lends itself to economical manufacture and which can be readily applied to the end of the hose.

A further object of this invention is to provide a flexible coupling which is capable of ready assembly and readily lends itself to use where blind hole connections are required.

A still further object of this invention is to provide an improved structure for attaching the flexible coupling to the shaft for effecting relative co-movement of same.

Still another object of this invention is to provide an improved flexible coupling structure including an end fitting which is capable of utilizing the shaft as a stabilizer to eliminate the cantilever or wobble action in normal operation.

Yet another object of this invention is to provide a flexible coupling structure which is longitudinally self adjusting without declutching same from driving cooperation with the drive shaft.

In accordance with the general features of this invention there is provided in a flexible shaft coupling for slip-on driving connection with a drive shaft to connect same to a driven shaft, the coupling comprising a resiliently flexible sleeve, a fitting at one end telescoping the sleeve to support same, and clutch means integral with the fitting and projecting endwise beyond the fitting for telescoping cooperation with the drive shaft and for slidingly clutching the drive shaft to the fitting, the clutch means being slidable on the drive shaft to afford limited longitudinal play of the sleeve without declutching same from driving cooperation with the drive shaft.

Another feature of this invention relates to the provision of a novel connection between a driving and a driven member of such construction so as to permit ready adjustment of the set screw on the driven member.

Another object of this invention is in the provision of a novel fitting which is in emergency readily detached from the assembly leaving the driving shaft exposed to which a standard coupling may be fastened.

Other objects of this invention will more fully appear from the following detailed description taken in connection with the accompanying drawings, which illustrate one embodiment thereof, and in which:

Figure 1 is a fragmentary side view, partly in cross-section, showing my novel flexible coupling connecting a pump shaft to a motor driven blower;

Figure 2 is an enlarged exploded cross-sectional view with parts in elevation, showing the flexible coupling along with the motor driven shaft just prior to assembly;

Figure 3 is a cross-sectional view taken substantially on line III—III looking in the directions indicated by the arrows; and Figure 4 is a cross-sectional view taken substantially on line IV—IV of Figure 1, looking in the direction indicated by the arrows.

As shown on the drawings:

It will be appreciated that while I have shown my invention as being applied for connecting a pump shaft to a motor driven fan shaft, it will of course be understood that my flexible coupling can be used in connecting other types of driving and driven members.

The reference character 10 designates generally my novel flexible coupling embodying features of this invention. The flexible coupling 10 is secured at one end to a driving member 11 which, for example, may comprise the shaft of a pump 12. Secured at the other end of the coupling 10 is a hub member 13 which is carried on a shaft 14 extending from a motor 15. The hub 13 has suitably secured thereto a conventional type squirrel blower fan 16 such as are used in the oil burner industry.

From Figure 2 it will be apparent that the hub member 13 is suitably secured to the shaft 14 by a set screw 17. Additionally, for reasons that will hereinafter become apparent, the hub 13 is offset axially rearward of the terminal end 18 of the shaft 14.

The flexible coupling 10 includes the usual tubular flexible element or hose 19 which may be made of any suitable resilient material such as rubber or the like. Mounted on opposite ends of the sleeve or hose 19 are a pair of cup-like metal clamping rings 20—21. The clamping rings 20—21 are suitably provided with a slightly curved end 22—23 for gripping the end of the hose. Inserted within the end of the hose 19 is a fitting or bushing 24 which has an axial opening 25 which closely approximates the cross section of the shaft 11. As will best be seen in Figures 2 and 4, the clamping ring 21, the hose 19, the bushing 24, and the shaft 11 are suitably held in unitary relation by a set screw 26.

Suitably floatingly carried on the other end of the hose 19 is my novel fitting or bushing 27 which embodies other features of this invention. The fitting 27 includes a tubular portion 28 which has an internal opening 29 which is of the same general dimension as the cross-section of the shaft 18. It will be noted in Figure 2 that the tubular portion 28 is coextensive in axial length with the clamping ring 20. The fitting or bushing 27 includes an intermediate stop portion 30 which is integral with the tubular portion 28 and comprises an annular radially extending member. The intermediate portion 30 has an opening or bore 31 which is concentric with the opening or bore 29 in the tubular portion 28 thereby providing a continuous bore 32 into which the shaft 18 is adapted to extend when the coupling is assembled with the hub 13 as hereinafter described.

Mounted on or integral with the stop portion 30 are a pair of tangs or tongues 33. These tangs 33 each have an inner surface 34 (Figure 3) which suitably defines a portion of the outer wall of the bore 32.

The fitting 27 could be manufactured of materials other than metal which would also serve the purpose of eliminating possible noise arising from metal to metal contact and minimize galling.

Provided on the hub 13 are a pair of mating slots or sockets 35—35 which are adapted to receive the tangs 33 when the coupling 10 is clutched or assembled with the hub 13. It will be appreciated that the tongue and socket connection above described could be reversed so that the hub is provided with the tangs and the stop 30 with the sockets without departing from the scope of the instant invention.

As a consequence of employing the above described coupling and fitting construction as opposed to presently used connections, the hub 13 is exposed after clutching engagement is effected thereby leaving the set screw 17 exposed so that the fan 16 could be repositioned after the unit is assembled.

In the assembly of my novel flexible coupling 10, the bushing 24 is inserted into one end of the hose 19 while the fitting 30 is slipped into the other end thereof. Thereafter the clamping rings 20—21 are urged over the respective ends of the hose 19 to forcibly clamp or sandwich the hose between the rings 20—21 and the bushings 27 and 24, respectively. Thereafter the shaft 11 is slid into the bore of the bushing 24 and a set screw 26 is tightened to secure one end of the coupling 10 to the shaft 11.

The end 18 of the shaft is used as a pilot in aligning and engaging the end 18 in the bore 32 of the coupling 10. In engaging the coupling 10 with the hub 13 the tongue and socket connections are brought into axial alignment by a slight rotation of the shaft 11 and then urged into engagement so that co-movement of the shafts 11 and 14 may be effected upon starting the motor 15.

It is in this manner that the coupling is automatically centered with respect to the hub with the tongue and socket connections being utilized to maintain the same in driving engagement. Furthermore, any possibility of rotational slippage occurring between the hub member 13 and the coupling 10 is eliminated. In addition, by virtue of employing a tongue and socket connection a limited amount of longitudinal play between the hub 13 and the coupling 10 is thereby permitted without the engagement or connection becoming declutched. This limited amount of play is highly advantageous since it serves to protect bearings, rotor and the like.

By telescoping the shaft 18 into the fitting opening 29 the tanged connection between the hub 13 and the fitting 27 is supported a minimize the cantilever effect or wobble effect which occurs in an unsupported type of connection. In other words, radial or lateral movement between the fitting 27 and the hub 13 is kept to a minimum.

It will be understood that modifications and variations may be effected without departing from the scope of the novel concepts of the present invention.

I claim as my invention:

1. In a flexible shaft structure including generally aligned but spaced drive and driven shafts, a flexible shaft coupling for slip-on driving connection with said drive shaft to connect same to said driven shaft, said coupling comprising a resiliently flexible sleeve for connection at one end to said driven shaft, a fitting at the other sleeve end telescoping the sleeve to support same, and clutch means integral with said fitting and projecting endwise beyond the fitting for telescoping cooperation with and supported by said drive shaft and for slidingly clutching the drive shaft to the fitting, said clutch means being longitudinally slidable relative to said drive shaft to afford limited longitudinal play of said sleeve without declutching same from driving cooperation with the drive shaft.

2. The structure of claim 1 further characterized by said fitting comprising a tubular portion telescoping said other end of said flexible sleeve, and a flange-like shoulder projecting radially outward from said portion in endwise abutment with said sleeve and said clutch means including longitudinally extending spaced clutch teeth projecting from and at right angles to said shoulder and at least partially defining a central bore through which said drive shaft projects telescopingly into said fitting tubular portion.

References Cited in the file of this patent

UNITED STATES PATENTS

| 1,815,559 | Garribus | July 21, 1931 |
| 1,883,203 | Whitehouse | Oct. 18, 1932 |
| 2,049,273 | Pott | July 28, 1936 |
| 2,174,010 | Patterson | Sept. 26, 1939 |
| 2,665,841 | Smith | Jan. 12, 1954 |